Figure 1:
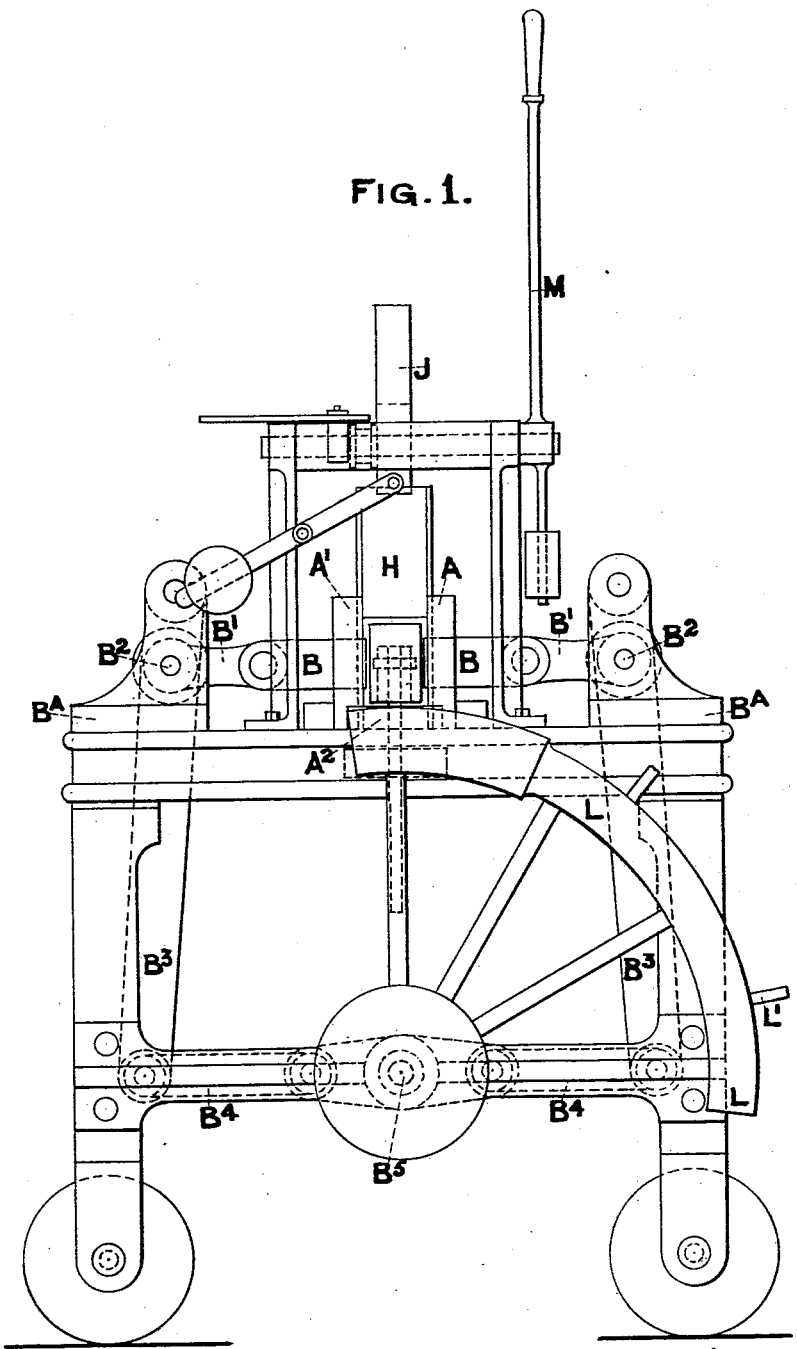

(No Model.)

R. T. HUGHES & J. GILL.
APPARATUS FOR PRESSING BRICK.

No. 573,514. Patented Dec. 22, 1896.

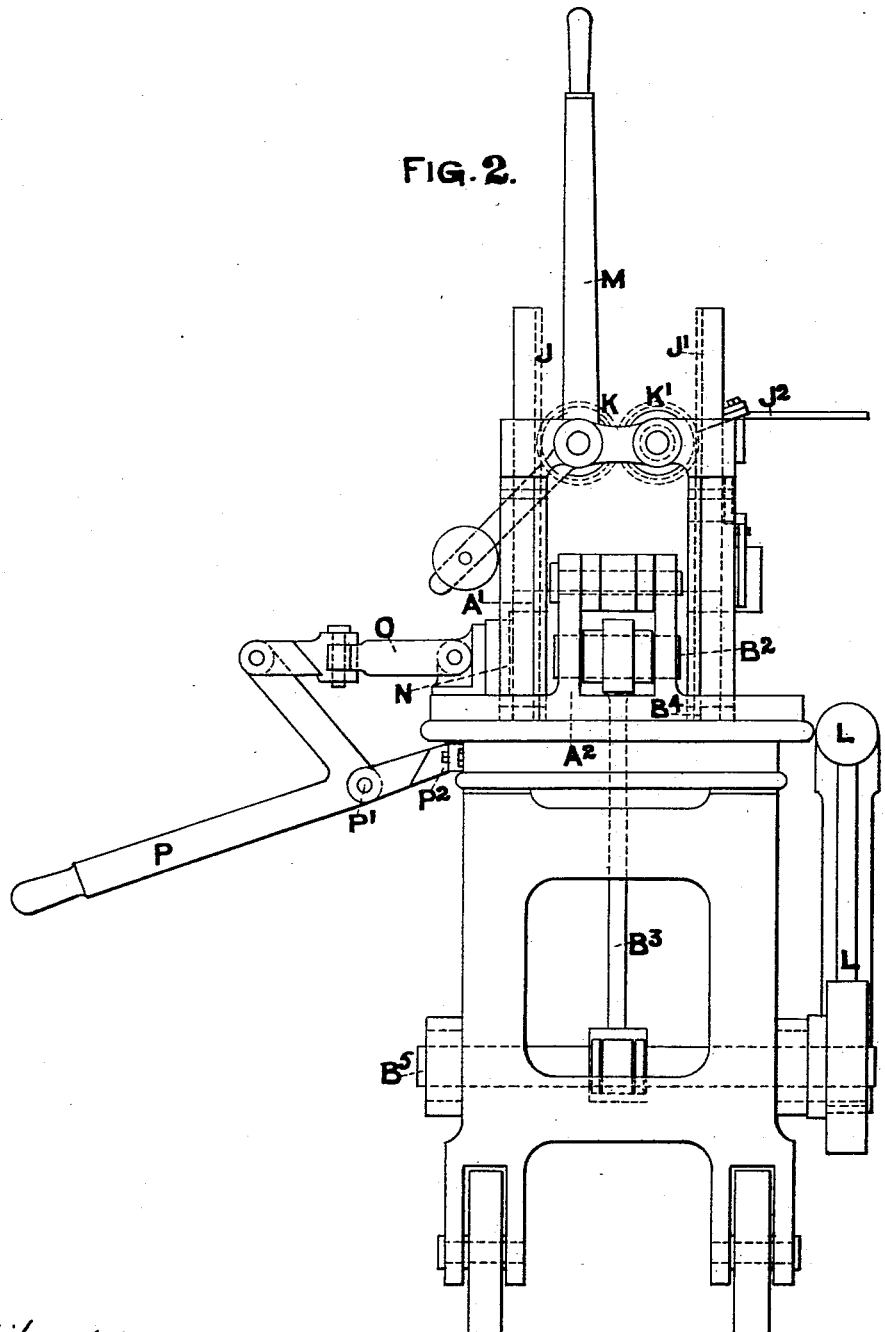

(No Model.)
R. T. HUGHES & J. GILL.
APPARATUS FOR PRESSING BRICK.
No. 573,514. Patented Dec. 22, 1896.
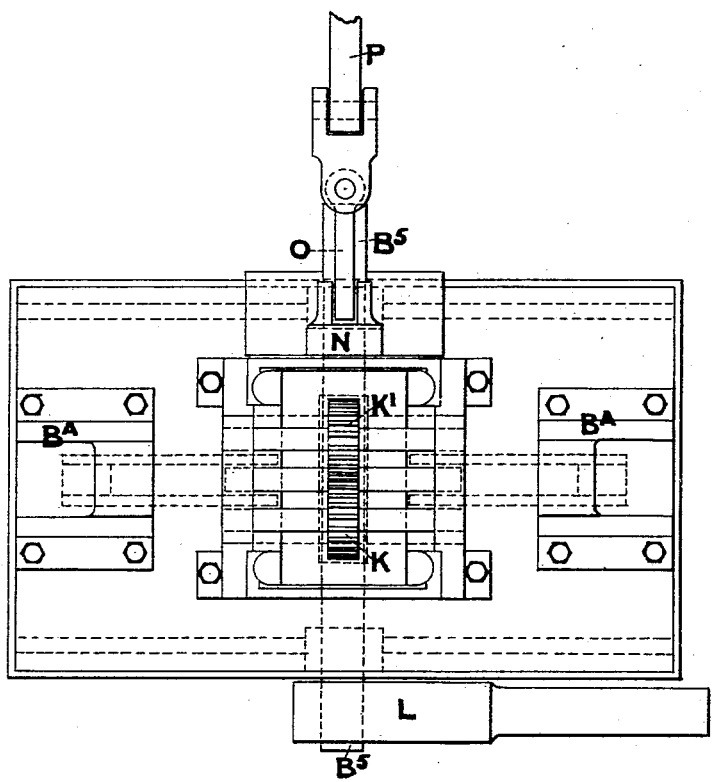

(No Model.) 5 Sheets—Sheet 4.
R. T. HUGHES & J. GILL.
APPARATUS FOR PRESSING BRICK.
No. 573,514. Patented Dec. 22, 1896.
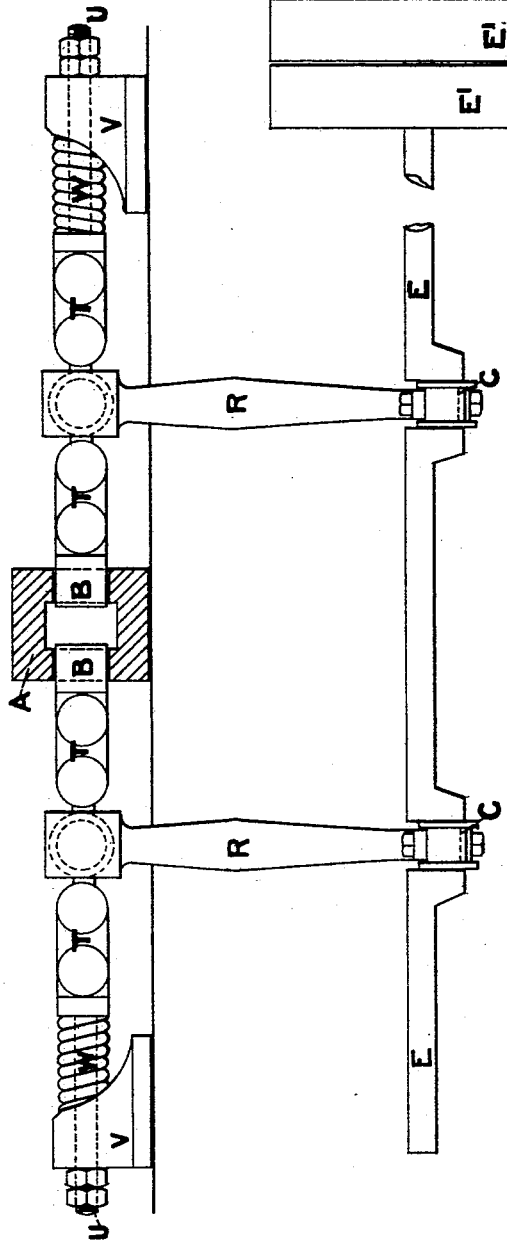
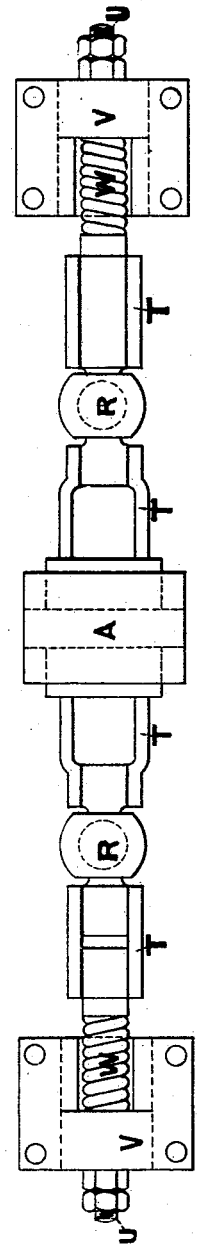

(No Model.) 5 Sheets—Sheet 5.
R. T. HUGHES & J. GILL.
APPARATUS FOR PRESSING BRICK.
No. 573,514. Patented Dec. 22, 1896.
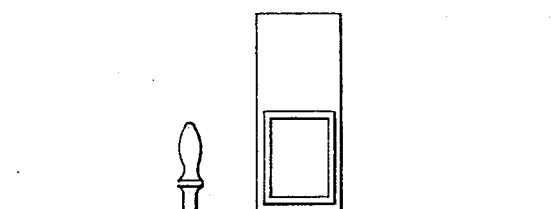
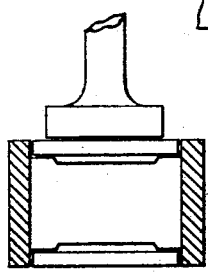
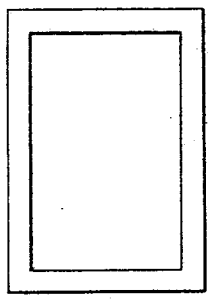
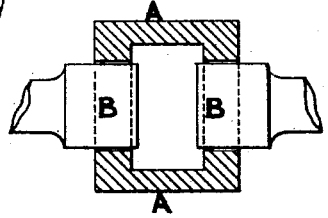
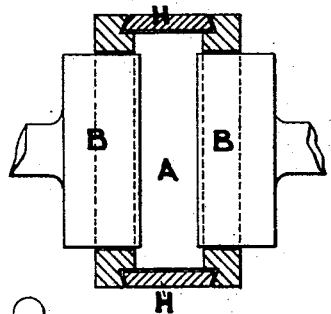
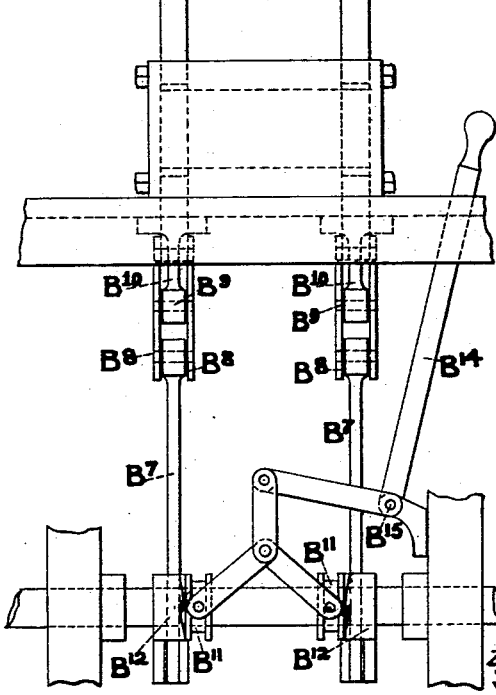

UNITED STATES PATENT OFFICE.

RALPH TOWNSEND HUGHES, OF SALTBURN, AND JOHN GILL, OF LEEDS, ENGLAND.

APPARATUS FOR PRESSING BRICK.

SPECIFICATION forming part of Letters Patent No. 573,514, dated December 22, 1896.

Application filed February 3, 1896. Serial No. 577,949. (No model.) Patented in England March 26, 1895, No. 6,239.

*To all whom it may concern:*

Be it known that we, RALPH TOWNSEND HUGHES, residing at Saltburn-by-the-Sea, and JOHN GILL, residing at Leeds, in the county of York, England, subjects of the Queen of Great Britain, have invented new and useful Improvements in Methods of and Apparatus or Machinery for Pressing Bricks, Tiles, and the Like, (for which we have obtained a patent in Great Britain, No. 6,239, dated March 26, 1895,) of which the following is a specification.

Our invention relates to improvements in the method of and in apparatus or machinery for pressing bricks, tiles, and the like.

The object of our invention is to press bricks, tiles, and the like upon the sides, or in a horizontal direction, and not downward, or in a vertical direction, as heretofore, so as to prevent the formation of arris upon the edges of same and to press them all to the same or one uniform thickness.

Figure 1 is a front elevation of our invention as operated by hand-power. Fig. 2 is an end elevation. Fig. 3 is a plan. Fig. 4 is a front elevation of our invention as operated by steam-power. Fig. 5 is a plan of Fig. 4. Fig. 6 is a front elevation of automatic arrangement for opening and closing the ends of the molds. Fig. 7 is a side elevation of Fig. 6. Figs. 8 to 11 may be termed "diagrammatic" views. Fig. 8 is a sectional end elevation of ordinary press-box with plunger. Fig. 9 is a plan. Fig. 10 is a sectional end elevation of our improved press-box with plungers or presser-blocks. Fig. 11 is a sectional plan of same.

According to our invention we employ one or more molds or boxes A, preferably fixed or stationary between presser-blocks B for obtaining the side or necessary pressing action. Instead of the said molds or boxes A being fixed or stationary they may be arranged so as to be capable of being moved by hand or automatically in turn between the said presser-blocks for obtaining the side or necessary pressing action and afterward moved away for discharging the pressed material by hand or automatically. The said presser-blocks B are operated by cranks and toggle mechanism or by levers and toggle mechanism from shafts mounted in the machine-frame, or by the equivalents of such. In Figs. 1 to 3 the said presser-blocks B are operated by levers and toggle mechanism and in Figs. 4 and 5 by cranks and toggle mechanism.

In Figs. 1 to 3 the presser-blocks B are joined to links B', centered at $B^2$ to arms or levers $B^3$, which are joined to links $B^4$, which are joined to the axis or shaft $B^5$ at both sides. (See Fig. 1.) The arms or levers $B^3$ are pivoted in bearings $B^A$ at the top end.

When it is desired to have the panels deep on one side and shallow on the other, this is effected by making one of the levers $B^3$ long and the other one short, so that there is a variation in the depth of the pressing action. The said molds or boxes A are made, preferably, in one piece or casting with a solid top A' and solid bottom $A^2$, with apertures in one or both sides for presser-blocks B to work through. The said molds or boxes A may be made in sections or segments jointed together or with removable liners for different sizes of bricks. The said molds or boxes A are provided or constructed with open ends, adapted to fit into which are slides H, which are automatically or manually raised or lowered or moved sidewise, so as to open or close the ends of the said boxes or molds, the said slides H being down or closed when the pressing action is put on and raised or moved away for the discharging action to take place. The said slides H may be formed in the shape of wedges or otherwise.

For the purpose of manually opening and closing the ends of the molds or boxes A the slides H of the said molds or boxes A are joined to racks J and J', which gear with pinions K and K'. These pinions K and K' normally gear with each other, and the pinion K' can be put in or out of gear with the rack J' by a clutch arrangement $J^2$, the rack J' being slightly smaller than the other one. This arrangement is shown in Figs. 1 to 3, and the automatic arrangement is shown in Figs. 6 and 7. Referring to these figures, the axis or shaft $B^5$ has arms $B^6$, joined to which are levers $B^7$ and $B^8$, the latter being fulcrumed at $B^9$ upon a bearing $B^{10}$, secured to the table of the machine and joined to the slide H of the mold or box A. Upon the said axis or shaft B⁵ are fixed couplings or clutches B¹¹ with movable pieces B¹², joined by lever mechanism B¹³ to a hand-lever B¹⁴, pivoted at B¹⁵ to the machine-frame. The action is: When the axis or shaft B⁵ is caused to turn by the action of the quadrant-wheel L, as hereinafter referred to, the levers B⁸ turn on their axes B⁹ and raise or lower the slides H, according to the direction in which the said quadrant-wheel is moved. By means of the said hand-lever B¹⁴ the coupling-pieces B¹² may be disengaged from the fixed couplings B¹¹.

Referring again to Figs. 1 to 3, L is the quadrant-wheel, carried on the axis or shaft B⁵ (and having hand-pins L') and by which the machine is operated. On throwing over the quadrant-wheel L the toggle or its equivalent mechanism causes the presser-blocks B to give their pressing action through apertures in the sides of the mold or box A, the slides H having previously been closed by the hand-lever M or simultaneously through the automatic apparatus described. After the pressing action has taken place the slides H are raised by hand through hand-lever M or automatically, as described under Figs. 6 and 7, and the quadrant-wheel reversed, so withdrawing the presser-blocks B.

By means of the shape of the mold A and the pressing action each brick is pressed to a uniform size and thickness and no arris is formed upon the brick. The holes in the sides of the mold are smaller in area than the said sides of the mold and do not extend to either of its edges or corners, and the indenting-plungers, which work in the said holes, bear directly against the clay. In consequence of this no ragged edge or arris is formed anywhere on any side of the brick while being pressed in the mold, but a perfectly clean edge in lieu thereof, which in bonding or building looks and is much smarter than bricks as pressed or made heretofore.

The bricks, after being pressed, are discharged endwise of the molds by means (see Fig. 2) of the pusher-out N, which slides on a level with the bottom A² of the mold or box A and is joined by link O to hand-lever P, pivoted at P' to a bracket P² upon the machine-frame. By operating the said hand-lever the pusher N is caused to pass through the mold or box A, so as to discharge the brick, and after such is easily and readily withdrawn.

In Figs. 4 and 5 the crank-shaft E is driven by pulleys E', one of which is fast and the other loose upon such shaft. The cranks C of said shaft E are joined to connecting-rods R, which are joined up to the links or toggle mechanism T, to which the presser-blocks B are connected. Rods U, carried by bearings V, are joined to the toggle mechanism T and have between them and the toggle mechanism spiral springs or cushions W for allowing for varying thicknesses of material. On operating the crank-shaft E the presser-blocks B, through the mechanism aforesaid, press the brick in the manner set forth with reference to Figs. 1 to 3; or the said molds or boxes A are provided with a movable top and solid ends or one solid end with small pusher-out in center and one loose end and a loose bottom or plate which is capable of being automatically raised for discharging the pressed article and lowered automatically after such discharge.

A cylinder or some similar arrangement carrying or provided with molds or boxes, as aforesaid, may be employed and rotated by hand automatically, so as to bring the said molds or boxes in turn between the said presser-blocks, so as to obtain the said pressing and delivery actions.

In some cases hinged doors with wheels, screws, weights, and loose plates may be employed in connection with the molds or boxes to close the ends.

A spring or cushion arrangement is provided in connection with the shafts operating the presser-blocks or in connection with the presser-blocks themselves, so as to compensate for varying thicknesses of material and to press all to one uniform thickness without arris.

The shafts or levers for operating the presser-blocks may be actuated by cams and runners or other suitable means.

The machine may be worked by hand or driven by power.

On comparing Figs. 10 and 11 with Figs. 8 and 9, the latter of which show the old system and Figs. 10 and 11 our new system of pressing, it will be seen that no arris or deviation in the pressing, such as occurs by the system illustrated by Figs. 8 and 9, can occur by the use of our new system.

We would have it understood that although the presser-blocks are shown acting in the molds A in a horizontal direction the molds A may be arranged so that the presser-blocks may act in a vertical direction.

What we claim as our invention, and desire to secure by Letters Patent, is—

1. In a brick-press, the combination, with a stationary mold closed at top and bottom, and provided with open ends, and holes in its sides; of slidable plates normally closing the said open ends, horizontally-arranged presser-blocks slidable in the said holes, and driving mechanism operating to reciprocate the said presser-blocks in opposite directions simultaneously, substantially as set forth.

2. In a brick-press, the combination, with a stationary mold closed at top and bottom, and provided with open ends having dovetailed guide-grooves, and holes in its sides; of slidable plates provided with dovetailed edges and normally closing the said open ends, and opposed presser-blocks arranged horizontally and slidable in the said holes, substantially as set forth.

3. In a brick-press, the combination, with a mold provided with open ends, of plates normally closing the said ends, an operating-shaft $B^5$, arms $B^6$ carried by the said shaft and provided with clutch-jaws, lever mechanism operatively connecting the said arms with the said plates, slidable clutch-jaws $B^{11}$ splined on the said shaft, and lever mechanism connected to the said clutch-jaws $B^{11}$ and operating to slide them simultaneously in opposite directions, substantially as set forth.

4. The combination, with a mold permanently closed upon all four sides and operating to form sharp square edges on the brick, said mold having open ends and a hole in one side of less area than the said side and not extending to the corners of the mold; of an indenting presser-block working in the said hole, and removable plates normally closing the open ends of the mold, substantially as set forth.

RALPH TOWNSEND HUGHES.
  JOHN GILL.

Witnesses:
 HERBERT DUNN,
 JABEZ BULLUS.